United States Patent
Beckman et al.

(10) Patent No.: US 10,872,341 B1
(45) Date of Patent: Dec. 22, 2020

(54) SECONDARY FRAUD DETECTION DURING TRANSACTION VERIFICATIONS

(71) Applicant: American Express Travel Related Services Company, Inc., New York, NY (US)

(72) Inventors: Michelle R. Beckman, Scottsdale, AZ (US); Scott Belsky, Phoenix, AZ (US); Vernon Marshall, London (GB); Ryan R. Sohm, Phoenix, AZ (US)

(*) Notice: Subject to any disclaimer, the term of this patent is extended or adjusted under 35 U.S.C. 154(b) by 0 days.

(21) Appl. No.: 16/185,099

(22) Filed: Nov. 9, 2018

(51) Int. Cl.
*G06Q 40/00* (2012.01)
*G06Q 20/40* (2012.01)
*G06N 7/00* (2006.01)
*G06Q 20/32* (2012.01)
*G06F 17/18* (2006.01)
*G06N 20/00* (2019.01)

(52) U.S. Cl.
CPC ......... *G06Q 20/4016* (2013.01); *G06F 17/18* (2013.01); *G06N 7/00* (2013.01); *G06N 20/00* (2019.01); *G06Q 20/325* (2013.01)

(58) Field of Classification Search
CPC .................................................. G06Q 20/4016
USPC .......................................................... 705/44
See application file for complete search history.

(56) References Cited

U.S. PATENT DOCUMENTS

| | | |
|---|---|---|
| 2008/0140576 A1 | 6/2008 | Lewis et al. |
| 2011/0238510 A1 | 9/2011 | Rowen et al. |
| 2012/0278249 A1 | 11/2012 | Duggal et al. |
| 2014/0122325 A1 | 5/2014 | Zoldi et al. |
| 2015/0039513 A1* | 2/2015 | Adjaoute ............ H04L 63/1425 705/44 |
| 2015/0073981 A1 | 3/2015 | Adjaoute |
| 2016/0078444 A1 | 3/2016 | Tomasofsky et al. |
| 2017/0132636 A1* | 5/2017 | Caldera .............. G06Q 20/3678 |
| 2017/0357977 A1* | 12/2017 | Pitz ........................ G06Q 20/32 |

OTHER PUBLICATIONS

Cascarino, Richard E. "Corporate Fraud and Internal Control: A Framework for Prevention", computer fraud and countermeasures, , Wiley Corporate F&a Ser. (Year: 2012).*

* cited by examiner

*Primary Examiner* — Edward Chang

(57) ABSTRACT

Systems and methods for secondary fraud detection during transaction verifications are disclosed. A payment system may transmit a fraud protection notification to a user in response to potential fraud being detected as part of a primary transaction fraud detection process. In response to the user interacting with the fraud protection notification to confirm that the transaction was not fraudulent, the system may capture user device data from the user's device. The system may perform a secondary fraud detection process on the captured user device data to determine whether the verification of the transaction has a risk of being fraudulent.

18 Claims, 3 Drawing Sheets

US 10,872,341 B1

SECONDARY FRAUD DETECTION DURING TRANSACTION VERIFICATIONS

FIELD

The disclosure generally relates to a transaction verification process, and more specifically, to a secondary fraud detection process during transaction verifications.

BACKGROUND

Users may desire to initiate transactions with a merchant using various methods. For example, a user may initiate a transaction with a merchant in person (e.g., via a brick and mortar store), by telephone, or online (e.g., via a mobile application, merchant website, etc.). In response to the user initiating the transaction, the merchant may transmit a transaction authorization to a payment system to approve the transaction. The payment system may process the transaction authorization to determine whether the transaction may be fraudulent.

Typically, in response to identifying the transaction as having a possibility of being fraudulent, the payment system may prompt the user to confirm that the transaction was made by the user (e.g., via email or text message). In response to the user's smart phone, computer, or email address being compromised, a third party may fraudulently confirm the transaction. A technical problem is that additional steps of fraud detection may increase processing, bandwidth, and memory usage in the payment system. Manual intervention and review may also be required to determine whether the transaction is fraudulent. Moreover, delayed resolution of pending transactions may result in abandoned transactions and a decrease in merchant satisfaction and user satisfaction.

SUMMARY

Systems, methods, and articles of manufacture (collectively, the "system") for secondary fraud detections during transaction verifications are disclosed. The system may receive captured user device data comprising characteristic data of a user device. The system may retrieve historical transaction fraud data based on the captured user device data. The system may determine a captured data fraud risk (e.g., a secondary fraud risk) based on the captured user device data. In response to determining that the captured data fraud risk is a high risk, the system may transmit a fraudulent verification notification to a payment system.

In various embodiments, in response to determining that the captured data fraud risk is a low risk, the system may transmit a verification approval to the payment system. In response to receiving the verification approval the payment system may be configured to remove a pending fraud status from an associated transaction account. In response to receiving the fraudulent verification notification the payment system may be configured to flag the associated transaction account for a manual fraud resolution. In various embodiments, the payment system may determine a primary fraud risk based on a transaction authorization request corresponding to the associated transaction account. In response to determining that the primary fraud risk indicates a potential fraud the payment system may transmit a fraud protection notification to the user device.

In various embodiments, the captured data fraud risk may be determined based on a comparison of the captured user device data to the historical transaction fraud data. The captured data fraud risk may also be determined based on if-then logic comparing the captured user device data to a fraud threshold. The captured data fraud risk may also be determined by inputting the captured user device data into at least one of a statistical model, a machine learning model, or an artificial intelligence model.

In various embodiments the captured user device data may comprise one or more of a unique device ID, an IP address, an operating system type, a web browser type, an enabled language, a screen resolution setting, a scripting setting, and/or an anonymous IP indicator.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

In various embodiments, systems and methods for secondary fraud detection in transaction verifications are disclosed. Users may initiate transactions with merchants to purchase goods or services. Merchants may transmit transaction authorizations to payment systems (e.g., issuer systems, financial institution, or the like) to authorize the user's transaction. During a transaction authorization, a primary fraud detection process may be performed to initially determine whether the transaction may be fraudulent. In response to determining that the transaction may be fraudulent, the payment system may transmit a notification to the user asking the user to verify whether the transaction was fraudulent. In response to the user confirming that the transaction is not fraudulent, the system may capture user device data from the device used by the user. The system may perform a secondary fraud detection process on the captured user device data to determine whether the transaction has a risk of being fraudulent, and/or whether the user's device, email account, or the like has been compromised.

Therefore, the system provides a technical solution to the technical problems present in typical transaction authorization and/or verification systems having only a primary fraud detection process. Thus, by authorizing a transaction using the processes described herein, the security of each transaction is increased, which decreases the risk of fraudulent transactions posed by compromised devices and/or networks. Moreover, the system increases confidence on trusted devices thus allowing for lower friction at the point of sale, increasing revenue for issuer systems and merchants, and enabling greater satisfaction for customers.

Figure 1:
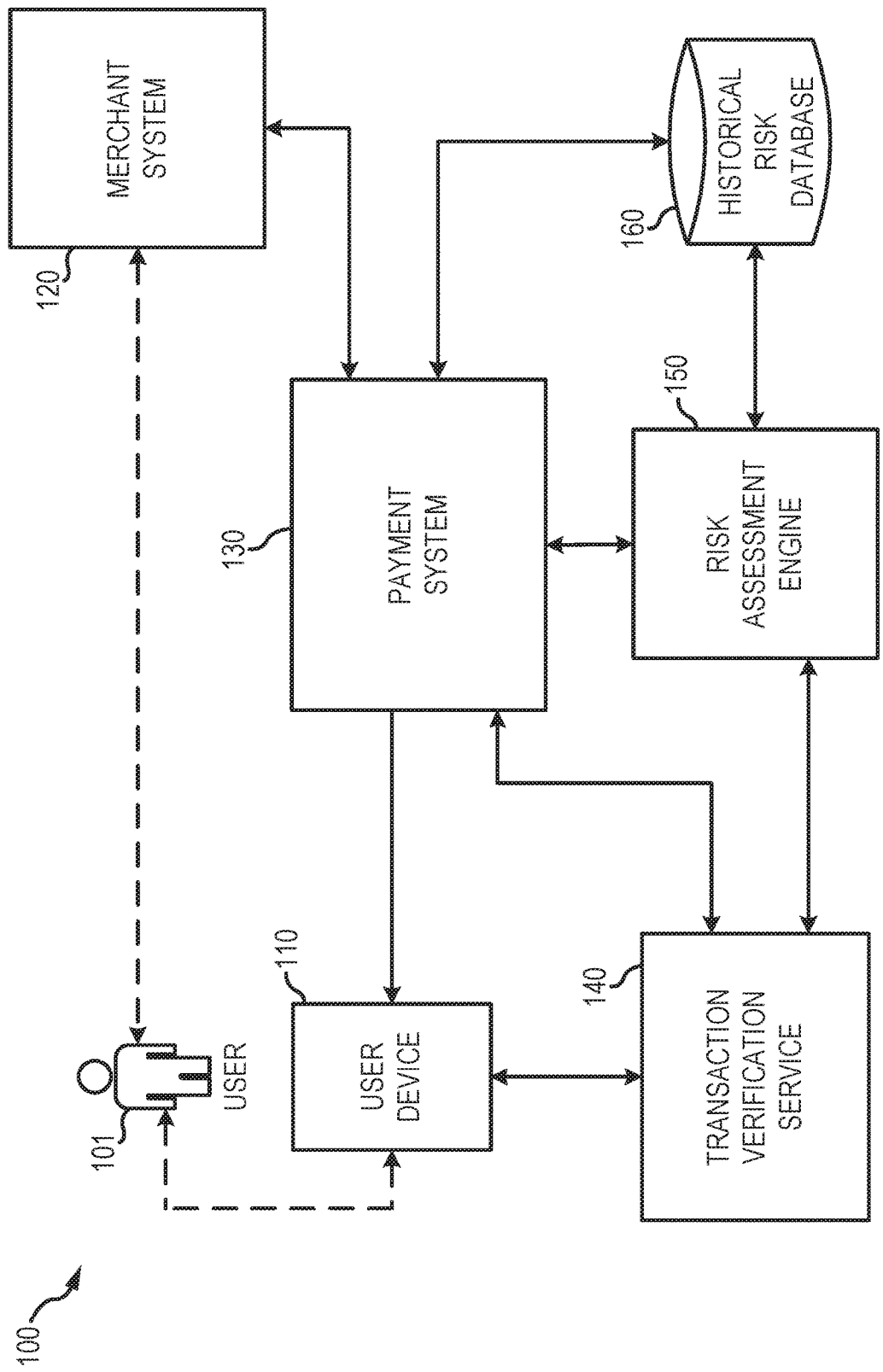
FIG. 1 is a block diagram illustrating various system components of a system for the detection of transaction fraud, in accordance with various embodiments.

In various embodiments, and with reference to FIG. 1, a system 100 for the detection of transaction fraud is disclosed (e.g., a transaction fraud detection system, a transaction verification fraud detection system, etc.). System 100 may comprise one or more of a user device 110, a merchant system 120, a payment system 130, a transaction verification service 140, a risk assessment engine 150, and/or a historical risk database 160. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, user 101 may initiate a transaction with a merchant via merchant system 120. For example, user 101 may initiate the transaction with merchant system 120 in-person (e.g., via a kiosk, brick and mortar store, etc.), online (e.g., via a merchant website, application, etc.), by telephone, or through any other desired method.

In various embodiments, merchant system 120 may be in electronic communication with payment system 130. Merchant system 120 may be configured to enable a merchant to receive a transaction request from a user and submit a transaction authorization request to payment system 130 to authorize the transaction. Merchant system 120 may incorporate one or more hardware, software, and/or database components. For example, merchant system 120 may comprise one or more network environments, servers, computer-based systems, processors, databases, datacenters, and/or the like. Merchant system 120 may include a graphical user interface ("GUI"), software modules, logic engines, various databases, and/or the like, configured to enable user 101 access to merchant system 120. In various embodiments, merchant system 120 may be computer based, and may comprise a processor, a tangible non-transitory computer-readable memory, and/or a network interface, along with other suitable system software and hardware components. Instructions stored on the tangible non-transitory memory may allow merchant system 120 to perform various operations, as described herein.

In various embodiments, merchant system 120 may also comprise a point of sale (POS) terminal configured as a mechanism to conduct the transaction. For example, the POS terminal may comprise a cashier station, a credit and/or debit card reader, an EMV card reader, and/or the like. The POS terminal may comprise a near-field communication (NFC) terminal, or any other suitable terminal enabling wireless transmission of data (e.g., BLUETOOTH®, Wi-Fi, etc.). The NFC terminal may allow for the transfer of information from a NFC enabling user device, such as, for example, user device 110.

In various embodiments, user device 110 may comprise any suitable hardware, software, and/or database components capable of sending, receiving, and storing data. For example, user device 110 may comprise a personal computer, personal digital assistant, cellular phone, smartphone (e.g., IPHONE®, BLACKBERRY®, and/or the like), IoT device, and/or the like. User device 110 may comprise an operating system such as, for example, a WINDOWS® mobile operating system, an ANDROID® operating system, APPLE® IOS®, a BLACKBERRY® operating system, a LINUX® operating system, and the like. User device 110 may also comprise software components installed on user device 110 and configured to allow user 101, via user device 110, access to various systems, services, and components in system 100. For example, user device 110 may comprise a web browser (e.g., MICROSOFT INTERNET EXPLORER®, GOOGLE CHROME®, etc.), an application, a micro-app or mobile application, or the like.

In various embodiments, user device 110 may comprise various user device characteristics (e.g., user device data). The user device characteristics may correspond to software, hardware, and/or physical parameters and settings of user device 110. For example, user device 110 may comprise a unique device ID, an IP address, an operating system type (e.g., WINDOWS®, ANDROID®, APPLE® IOS®, LINUX®, etc.), a web browser type (e.g., MICROSOFT INTERNET EXPLORER®, GOOGLE CHROME®, etc.), an enabled language (e.g., English, Spanish, Italian, etc.), a screen resolution setting, scripting settings (e.g., JAVACRIPT® enabled web browser), an anonymous IP indicator, and/or the like. In various embodiments, one or more user device characteristics may be captured by transaction verification service 140, as discussed further herein.

In various embodiments, payment system 130 may be configured to receive, process, and authorize transaction authorization requests from merchant system 120, as discussed further herein. Payment system 130 may comprise an issuer system, financial institution, or the like capable of processing transactions. Payment system 130 may be in electronic communication with user device 110, merchant system 120, transaction verification service 140, risk assessment engine 150, and/or historical risk database 160. Payment system 130 may comprise any suitable combination of hardware, software, and/or database components. For example, payment system 130 may comprise one or more network environments, servers, computer-based systems, processors, databases, and/or the like. Payment system 130 may comprise at least one computing device in the form of a computer or processor, or a set of computers/processors, although other types of computing units or systems may be used such as, for example, a server, web server, pooled servers, or the like. Payment system 130 may also include one or more data centers, cloud storages, or the like, and may include software, such as APIs, configured to perform various operations discussed herein. In various embodiments, payment system 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, payment system 130 may comprise or interact with a traditional payment network or transaction network to facilitate transactions, purchases, and payments, authorize transactions, settle transactions, and the like. For example, payment system 130 may represent existing proprietary networks that presently accommodate transactions for credit cards, debit cards, and/or other types of transaction accounts or transaction instruments. Payment system 130 may be a closed network that is secure from eavesdroppers. In various embodiments, payment system 130 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, issuer network or system, or the like. Payment system 130 may include systems and databases related to financial and/or transactional systems and processes such as, for example, one or more authorization engines, authentication engines and databases, settlement engines and databases, accounts receivable systems and databases, accounts payable systems and databases, and/or the like. In various embodiments, payment system 130 may also comprise a transaction account issuer's Credit Authorization System ("CAS") capable of authorizing transactions, as discussed further herein.

In various embodiments, transaction verification service 140 may be in electronic communication with user device 110, payment system 130, and/or risk assessment engine 150. Transaction verification service 140 may comprise various hardware, software, and/or database components. Transaction verification service 140 may comprise software-based services, APIs, SDKs, or the like configured to perform various fraud detection operations, as discussed further herein. For example, transaction verification service 140 may comprise a mobile device authentication and fraud prevention software solution, such as the INAUTH SECURITY PLATFORM™ offered by InAuth, Inc. The mobile device authentication and fraud prevention software solution may provide additional fraud detection services, such as, for example, the generation of a fraud score based on captured user device data. The fraud score may be configured to provide an analysis of the likelihood that user device 110, or an email account for user 101, has been compromised by a third party.

Transaction verification service 140 may be configured to capture the user device characteristics (e.g., captured user device data) from user device 110 in response to user device 110 accessing transaction verification service 140. Transaction verification service 140 may be configured to capture the user device characteristics by executing an XML script configured to retrieve and capture the user device characteristics from user device 110. For example, and as discussed further herein, in response to payment system 130 determining potential fraud in a transaction, payment system 130 may transmit a fraud protection notification to user device 110. The fraud protection notification may be transmitted via a notification channel such as, for example, email, SMS, MMS, a push notification, or the like. The notification channel may be specified by user 101 (e.g., a mobile phone number, email address, or the like may be provided to payment system 130 by user 101). The fraud protection notification may prompt user 101, via user device 110, to identify whether the given transaction was fraudulently attempted (e.g., "Do you recognize this recent purchase?"). The fraud protection notification may also comprise data regarding the transaction, such as, for example, a merchant name, a transaction amount, a transaction status (e.g., "not approved"), and/or the like. In response to user 101 confirming whether the transaction was fraudulent (e.g., by accessing a web link, by clicking on a "Yes" button or a "No" button, etc.), transaction verification service 140 may be invoked to capture the user device characteristics.

Based on the fraud protection notification, transaction verification service 140 may transmit data to payment system 130 and/or risk assessment engine 150. For example, in response to user 101 indicating that the transaction was fraudulent, transaction verification service 140 may notify payment system 130 to flag the transaction and associated transaction account. In response to user 101 indicating that the transaction was not fraudulent, transaction verification service 140 may transmit the captured user device data to risk assessment engine 150 to perform a secondary fraud detection, as discussed further herein.

In various embodiments, risk assessment engine 150 may be in electronic communication with payment system 130, transaction verification service 140, and/or historical risk database 160. Risk assessment engine 150 may comprise one or more software, hardware, and/or database components. For example, and in accordance with various embodiments, risk assessment engine 150 may comprise software services, APIs, SDKs, logic engines, or the like, and may be configured to perform various operations in response to receiving data from transaction verification service 140, as discussed further herein. As a further example, and in accordance with various embodiments, risk assessment engine 150 may comprise one or more network environments, servers, computer-based systems, processors, databases, datacenters, and/or the like. Risk assessment engine may be computer-based, and may comprise a processor, a tangible non-transitory computer-readable memory, and/or a network interface, along with other suitable system software and hardware components. Instructions stored on the tangible non-transitory memory may allow risk assessment engine 150 to perform various operations, as described herein.

Risk assessment engine 150 may be configured to perform a secondary transaction fraud detection process to determine whether communications from user 101, via user device 110, are fraudulent (e.g., a captured data fraud risk). For example, in response to receiving the captured user device data from transaction verification service 140, risk assessment engine 150 may be configured to perform various operations on the captured user device data to determine whether the captured user device data indicates possible fraud. For example, risk assessment engine 150 may query historical risk database 160 to retrieve historical transaction fraud data. The historical transaction fraud data may comprise various device data characteristics known to originate from fraudulent sources, fraud rates associated with the device data, and/or the like. In that regard, risk assessment engine 150 may compare the captured user device data against the historical transaction fraud data to determine whether the captured user device data comprises data known to originate from a fraudulent source. For example, in response to the historical transaction fraud data comprising a low fraud rate (or not existing), risk assessment engine 140 may determine that the captured user device data is not from a fraudulent source. In response to the historical transaction fraud data matching the captured user device data and having a high fraud rate, risk assessment engine 140 may determine that the captured user device data is from a fraudulent source.

As a further example, and in accordance with various embodiments, risk assessment engine 150 may comprise if-then logic configured to determine whether the captured user device data indicates possible fraud. The if-then logic may comprise various fraud thresholds corresponding to one or more of the captured user device data. For example, an exemplary if-then logic may comprise, "if the captured IP address has been captured more than 5 times in one day, then the transaction is fraudulent," "if the screen resolution setting is low and the enabled language is French, then the transaction is fraudulent," and/or any other suitable if-then logic.

As a further example, and in accordance with various embodiments, risk assessment engine 150 may implement statistical models, machine learning, artificial intelligence, and the like to aid in identifying possible fraud. In that regard, the captured user device data may be input into the statistical model, the machine learning model, or the artificial intelligence model to determine a risk of fraud. For example, and in accordance with various embodiments, a model may consume the captured user device data, the historical transaction fraud data, and/or non-device related attributes (e.g., a risk level of transaction, a time of day, maintenance activity on the transaction account, etc.). Based on the data consumption, the model may be leveraged to predict whether the verification is coming from a fraudulent device.

Risk assessment engine 150 may be configured to classify the determination of fraud using any suitable scale, such as, for example, "low risk," "medium risk," or "high risk. Based on the risk level, risk assessment engine 150 may communicate with payment system 130. For example, and in accordance with various embodiments, in response to the captured data fraud risk being a "low risk," risk assessment engine 150 may transmit a verification approval to payment system 130. In response to receiving the verification approval, payment system 130 may remove any pending fraud statuses, flags, or the like from the transaction or associated transaction account. In that regard, user 101 may retry the transaction with merchant system 120. As a further example, and in accordance with various embodiments, in response to the captured data fraud risk being a "high risk," risk assessment engine 150 may transmit a fraudulent verification notification to payment system 130. In response to receiving the fraudulent verification notification, payment system 130 may flag the associated transaction account for a fraud resolution follow-up. The flag may block all self-service channels (e.g., online account access) from verifying the transaction activity. Payment system 130 may also transmit a notification to user 101, via user device 110, to manually call to resolve the fraud.

In various embodiments, historical risk database 160 may be configured to store and maintain the historical transaction fraud data. Historical risk database 160 may comprise any suitable data structure, database, table, or the like capable of storing and maintaining data. The historical transaction fraud data may be updated by any suitable source, such as, for example, payment system 130 and/or risk assessment engine 150. In various embodiments, the historical transaction fraud data may also be updated from any suitable internal or external source. For example, historical risk database 160 may subscribe to services, coalitions, or the like that generate and track fraudulent transaction data, fraudulent or spoofed IP addresses and/or user device data, and the like.

Figure 2:
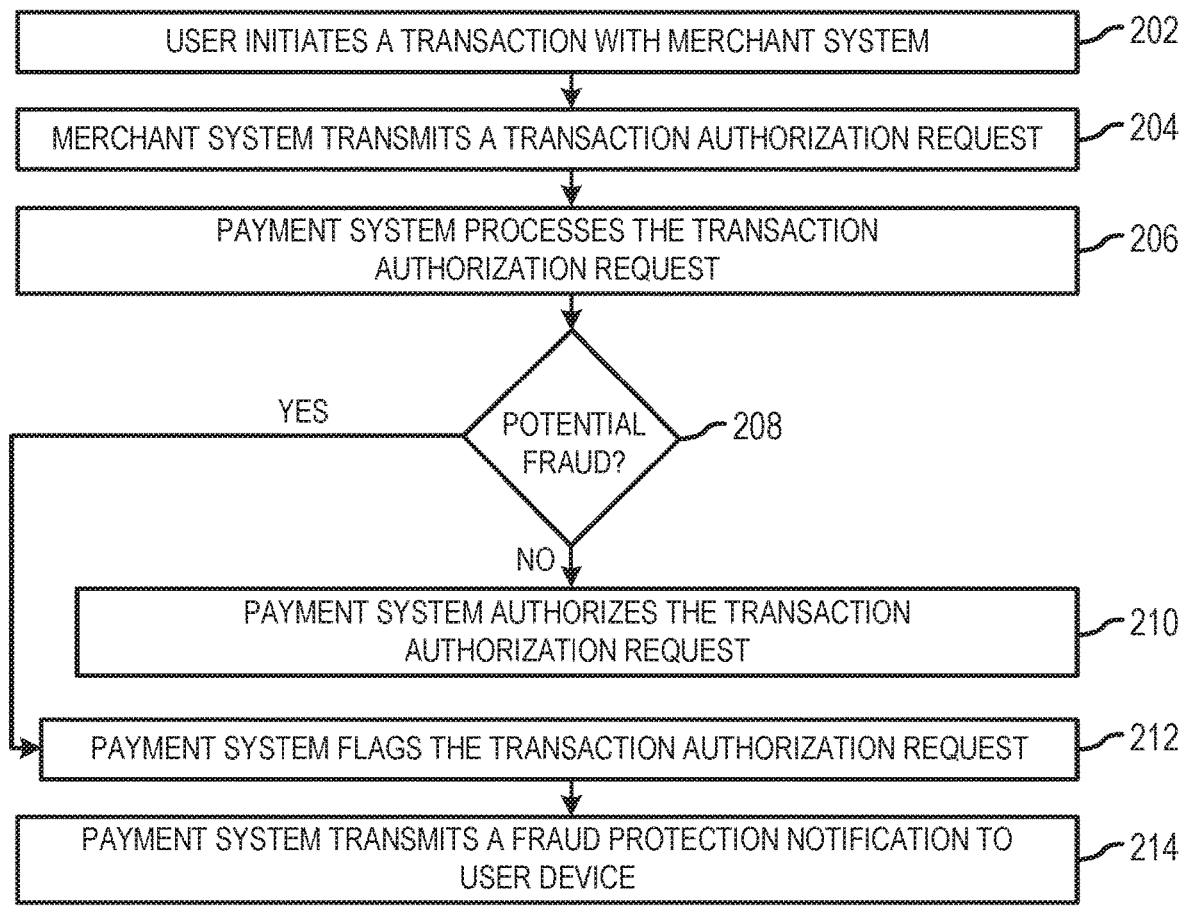
FIG. 2 illustrates a process flow for a method of primary transaction fraud detection, in accordance with various embodiments.
Figure 3:
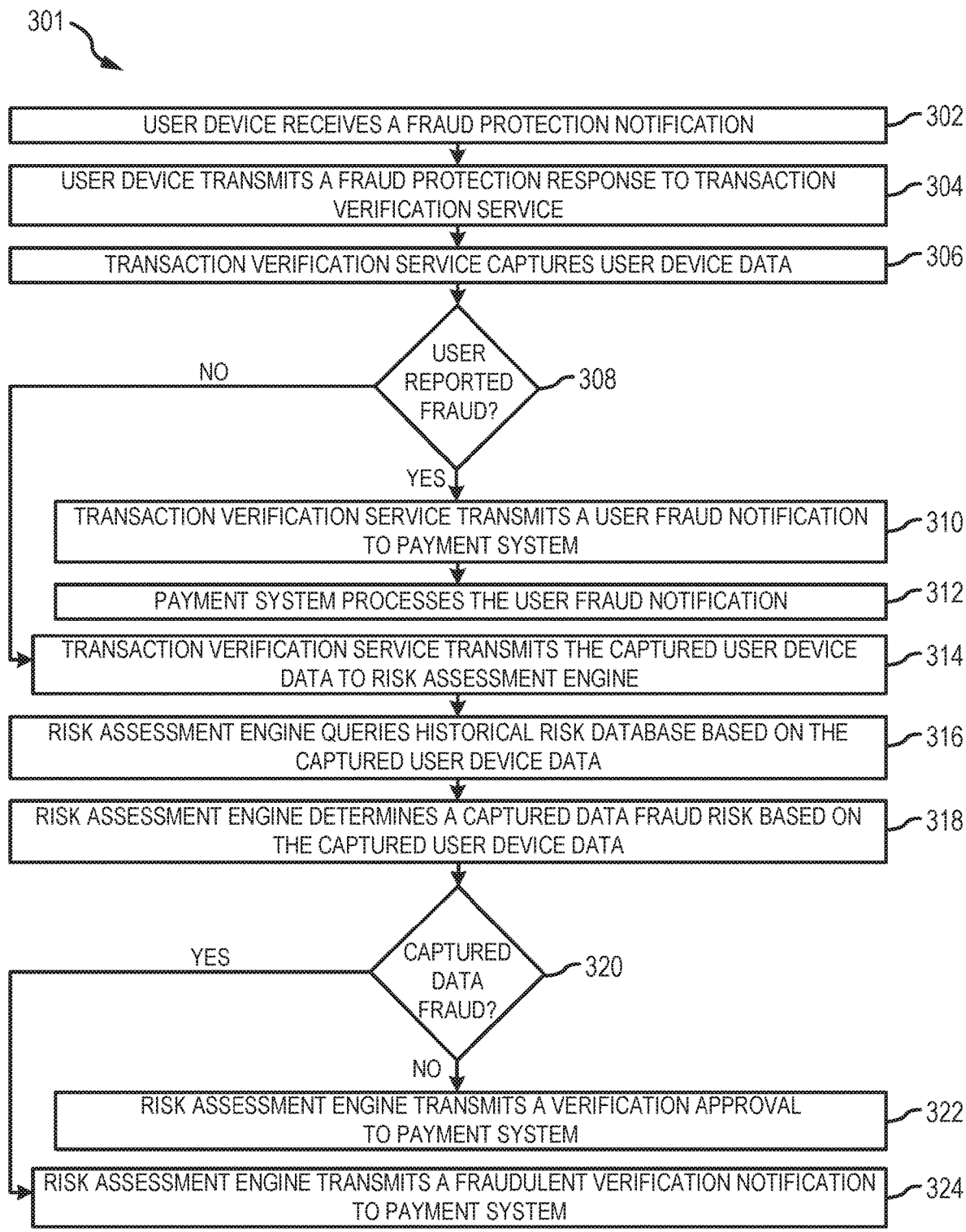
FIG. 3 illustrates a process flow for a method of secondary transaction fraud detection, in accordance with various embodiments.

Referring now to FIGS. 2 and 3 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2 and 3, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, and with specific reference to FIG. 2, a method 201 for primary transaction fraud detection is disclosed. User 101 initiates a transaction with merchant system 120 (step 202). For example, user 101 may shop at a merchant brick and mortar store, kiosk, website, mobile application, or the like, and may interact with merchant system 120 to initiate a transaction. User 101 may initiate the transaction by selecting goods or services to purchase, by swiping, tapping, or inserting a transaction instrument, and/or by inputting transaction account details (e.g., transaction account number, security code, expiration date, etc.).

In response to user 101 initiating the transaction, merchant system 120 transmits a transaction authorization request (step 204) to payment system 130. The transaction authorization request may comprise user data (e.g., transaction account number, security code, expiration date, etc.), merchant data (e.g., merchant ID, geographical code, etc.), transaction amount, and/or the like. In response to receiving the transaction authorization request, payment system 130 processes the transaction authorization request (step 206) to determine whether the transaction may be fraudulent (e.g., a primary fraud detection process). Payment system 130 (via an authorization system or the like) may process the transaction authorization request using any suitable technique and fraud detection process. For example, payment system 130 may retrieve data regarding the transaction account associated with user 101 to check if the account is active, has been recently flagged for fraud, and/or the like. Payment system 130 may retrieve recent purchases and determine whether the geographical codes align with the geographical code of the transaction authorization request (e.g., user 101 purchases goods in Spain and Brazil on the same day).

In response to determining that the transaction is not fraudulent (step 208), payment system 130 authorizes the transaction authorization request (step 210). For example, payment system 130 may transmit a transaction authorization approval to merchant system 120. In response to receiving the transaction authorization approval, merchant system 120 may complete the transaction with user 101. Payment system 130 may also proceed with settling the transaction and distributing funds from the user 101 transaction account to a merchant account associated with merchant system 120.

In response to determining that the transaction may be fraudulent (step 208), payment system 130 flags the transaction authorization request (step 212). For example, payment system 130 may decline the transaction authorization request, and may flag the associated transaction account by placing a pending fraud status on the transaction account. Payment system 130 transmits a fraud protection notification to user 101 (step 214). The fraud protection notification may be transmitted via one or more notification channels such as, for example, email, SMS, MMS, a push notification, or the like. The notification channels may be specified by user 101 (e.g., a mobile phone number, email address, or the like may be provided to payment system 130 by user 101). For example, user 101 may specify the notification channel during opening of the associated transaction account, during registration of an online account corresponding to the associated transaction account, and/or the like. The fraud protection notification may comprise data prompting user 101 to confirm whether the transaction was fraudulent, unknown, or otherwise not approved by user 101. For example, the fraud protection notification may prompt user 101, via user device 110, to identify whether the given transaction was fraudulently attempted (e.g., "Do you recognize this recent purchase?"), and may comprise data regarding the transaction such as, for example, a transaction data, a merchant name, a transaction amount, a transaction status (e.g., "not approved," "pending," "declined," etc.), and/or the like.

In various embodiments, and with specific reference to FIG. 3, a method 301 for secondary transaction fraud detection is disclosed. User device 110 receives the fraud protection notification (step 302) from payment system 130. User device 110 transmits a fraud protection response to transaction verification service 140 (step 304). The fraud protection response may comprise data indicating whether user 101 confirms whether the transaction was fraudulent (e.g., "Yes," "No," "Not Fraud," "Fraud," etc.). User 101 may input the fraud protection response by selecting a link, hyperlink, image, or the like provided in the fraud protection notification (e.g., a "Fraud" button, a "Not Fraud" button, etc.) or other method for providing feedback. In response to user 101 selecting the link, hyperlink, image, or the like (e.g., transmitting the fraud protection response), user device 110 may access transaction verification service 140.

In response to receiving the fraud protection response, transaction verification service 140 captures user device data (step 306) from user device 110. For example, transaction verification service 140 may comprise a script configured to execute to capture user device data from user device 110. The script may be embedded in a website configured to launch in response to user 101 responding to the fraud protection notification. The embedded script (e.g., transaction verification service 140) may seamlessly capture the user device data without needing user 101 to confirm a security alert or allow transaction verification service 140 access to user device 110. The user device data may comprise characteristics corresponding to software, hardware, and/or physical parameters and settings of user device 110, such as, for example, a unique device ID, an IP address, an operating system type (e.g., WINDOWS®, ANDROID®, APPLE® IOS®, LINUX®, etc.), a web browser type (e.g., MICROSOFT INTERNET EXPLORER®, GOOGLE CHROME®, etc.), an enabled language (e.g., English, Spanish, Italian, etc.), a screen resolution setting, scripting settings (e.g., JAVACRIPT® enabled web browser), an anonymous IP indicator, and/or the like.

In response to the fraud protection response comprising user reported fraud (step 308), transaction verification service 140 transmits a user fraud notification to payment system 130 (step 310). For example, in response to user 101 selecting that the transaction was fraudulent, transaction verification service 140 also notifies payment system 130 of the fraudulent transaction by transmitting the user fraud notification to payment system 130. The user fraud notification may comprise the fraud protection response and/or the captured user device data. In response to receiving the user fraud notification, payment system 130 processes the user fraud notification (step 312). For example, payment system 130 may place a hold on the transaction account and mark the transaction account for a manual fraud resolution. The notification may comprise data indicating that the attempted transaction was fraudulent. In various embodiments, payment system 130 may locally store (or via historical risk database 160) the captured user device data for historical data tracking.

In response to the fraud protection response not comprising user reported fraud (step 308), transaction verification service 140 transmits the captured user device data to risk assessment engine 150 (step 314). For example, in response to user 101 selecting that the transaction was not fraudulent, transaction verification service 140 transmits the captured user device data to risk assessment engine 150 to perform a secondary transaction fraud detection. In response to receiving the captured user device data, risk assessment engine 150 queries historical risk database 160 based on the captured user device data (step 316).

Risk assessment engine 150 determines a captured data fraud risk (e.g., a secondary fraud risk) based on the captured user device data (step 318). For example, and in accordance with various embodiments, risk assessment engine 150 may compare the captured user device data against the historical transaction fraud data to determine whether the captured user device data comprises data known to originate from a fraudulent source. As a further example, and in accordance with various embodiments, risk assessment engine 150 may comprise if-then logic configured to determine whether the captured user device data indicates possible fraud. The if-then logic may comprise various fraud thresholds corresponding to one or more of the captured user device data. For example, an exemplary if-then logic may comprise, "if the captured IP address has been captured more than 5 times in one day, then the transaction is fraudulent," "if the screen resolution setting is low and the enabled language is French, then the transaction is fraudulent," and/or any other suitable if-then logic. As a further example, and in accordance with various embodiments, risk assessment engine 150 may implement statistical models, machine learning, artificial intelligence, and the like to aid in identifying possible fraud. In that regard, the captured user device data may be input into the statistical model, the machine learning model, or the artificial intelligence model to determine a risk of fraud. For example, and in accordance with various embodiments, a model may consume the captured user device data, the historical transaction fraud data, and/or non-device related attributes (e.g., a risk level of transaction, a time of day, maintenance activity on the transaction account, etc.). Based on the data consumption, the model may be leveraged to predict whether the verification is coming from a fraudulent device.

In response to the captured user device data not being determined to be fraudulent (step 320), risk assessment engine 150 transmits a verification approval to payment system 130 (step 322). For example, in response to the captured user device data comprising a "low risk," risk assessment engine 150 may transmit the verification approval to payment system 130. In response to receiving the verification approval, payment system 130 may remove any pending fraud statuses from the transaction account. In various embodiments, payment system 130 may also transmit a notification to user 101, via email, SMS, MMS, push notification, etc., to re-attempt the transaction with merchant system 120. In various embodiments, the notification may also comprise a summary of the verification approval, indicating that user 101 cleared the concern of fraud.

In response to the captured user device data being determined to be fraudulent (step 320), risk assessment engine 150 transmits a fraudulent verification notification to payment system 130 (step 324). For example, in response to the captured user device data comprising a "high risk," risk assessment engine 150 may transmit the fraudulent verification notification to payment system 130. In response to receiving the fraudulent verification notification, payment system 130 may flag the associated transaction account for a manual fraud resolution follow-up. Payment system 130 may also block all digital access to the transaction account (e.g., via an online portal or the like). In various embodiments, payment system 130 may also transmit a fraud notification to user 101, via email, SMS, MMS, push notification, or the like. The fraud notification may also be displayed to user 101 via a user interface, web page, or the like. The fraud notification may request user 101 to call a customer service representative to manually resolve the fraud concern. In that regard, user 101 may call to confirm the fraudulent use, close the transaction account, issue a new transaction instrument or transaction account number, and/or the like.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, user device 110 may also comprise a biometric security system that may be used for providing biometrics as a primary or secondary form of identification. The biometric security system may include a transponder and a reader communicating with user device 110. The biometric security system also may include a biometric sensor that detects biometric samples and a device for verifying biometric samples. The biometric security system may be configured with one or more biometric scanners, processors and/or systems. A biometric system may include one or more technologies, or any portion thereof. As used herein, a biometric may include a user's voice, fingerprint, facial, ear, signature, vascular patterns, DNA sampling, hand geometry, sound, olfactory, keystroke/typing, iris, retinal, or any other biometric relating to recognition based upon any body part, function, system, attribute and/or other characteristic, or any portion thereof.

In various embodiments, the system and various components (e.g., user device 110) may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices. As a further example, the smart digital assistant technologies may be used by user 101 and/or merchant 103 to initiate and complete motion-enabled transactions, as discussed further herein.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The terms "payment vehicle," "transaction account," "financial transaction instrument," "transaction instrument", and/or the plural form of these terms may be used interchangeably throughout to refer to a financial instrument. Phrases and terms similar to "transaction account" may include any account that may be used to facilitate a financial transaction.

Phrases and terms similar to "account," "account number," "account code", or "consumer account" as used herein, may include any device, code (e.g., one or more of an authorization/access code, personal identification number ("PIN"), internet code, other identification code, and/or the like), number, letter, symbol, digital certificate, smart chip, digital signal, analog signal, biometric, or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card, or an associated account.

Phrases and terms similar to "financial institution" or "transaction account issuer" may include any entity that offers transaction account services. Although often referred to as a "financial institution," the financial institution may represent any type of bank, lender, or other type of account issuing institution, such as credit card companies, card sponsoring companies, or third-party issuers under contract with financial institutions. It is further noted that other participants may be involved in some phases of the transaction, such as an intermediary settlement institution.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.)

is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX' operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce in/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, ask, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   identifying, by a risk assessment engine, a primary fraud risk based on a transaction request corresponding to a transaction account;
   identifying, by the risk assessment engine, a notification channel for a fraud protection notification;
   transmitting, by the risk assessment engine, a notification through the notification channel to a user device in response to identifying the primary fraud risk, the notification comprising a link to the risk assessment engine comprising a confirmation link that confirms the transaction is legitimate;
   obtaining, by the risk assessment engine, a response to the notification from the user device, the response comprising the user device accessing the link to the risk assessment engine transmitted through the notification channel to the user device;
   executing, by a transaction verification service, a script associated with the link, the script configured to retrieve and capture user device data from the user device accessing the link to the risk assessment engine, wherein the user device data comprises at least one characteristic corresponding to software or physical parameters of the user device;
   receiving, by the risk assessment engine, captured user device data from the script;
   retrieving, by the risk assessment engine, historical transaction fraud data based on the captured user device data, the historical transaction fraud data comprising a plurality of device data characteristics known to originate from a fraudulent source;
determining, by the risk assessment engine, a secondary fraud risk based on the captured user device data by determining whether the captured user device data matches data from the historical transaction fraud data; and
transmitting, by the risk assessment engine, a fraudulent verification notification to a payment system in response to determining that the secondary fraud risk is a high risk based upon the captured device data matching data from the historical transaction data.

2. The method of claim 1, further comprising transmitting, by the risk assessment engine, a verification approval to the payment system in response to determining the secondary fraud risk is a low risk.

3. The method of claim 2, wherein in response to receiving the verification approval the payment system removes a pending fraud status from the transaction account.

4. The method of claim 1, wherein in response to receiving the fraudulent verification notification the payment system flags the transaction account for a manual fraud resolution.

5. The method of claim 1, wherein the secondary fraud risk is determined based on if-then logic comparing the captured user device data to a fraud threshold.

6. The method of claim 1, wherein the secondary fraud risk is determined by inputting the captured user device data into at least one of a statistical model, a machine learning model, or an artificial intelligence model.

7. The method of claim 1, wherein the captured user device data comprises at least one of a unique device ID, an internet protocol (IP) address, an operating system type, a web browser type, an enabled language, a screen resolution setting, a scripting setting, or an anonymous IP indicator.

8. A system comprising:
a processor; and
a tangible, non-transitory memory configured to communicate with the processor, the tangible, non-transitory memory having instructions stored thereon that, in response to execution by the processor, cause the processor to perform operations comprising:
identifying, by the processor, a primary fraud risk based on a transaction request corresponding to a transaction account;
identifying, by the processor, a notification channel for a fraud protection notification;
transmitting, by the processor, a notification through the notification channel to a user device in response to identifying the primary fraud risk, the notification comprising a link to a risk assessment engine comprising a confirmation link that confirms the transaction is legitimate;
obtaining, by the processor, a response to the notification from the user device, the response comprising the user device accessing the link to the risk assessment engine;
executing, by the processor, a script associated with the link, the script configured to retrieve and capture user device data from the user device accessing the link to the risk assessment engine, wherein the user device data comprises at least one characteristic corresponding to software or physical parameters of the user device;
receiving, by the processor, captured user device data from the script;
retrieving, by the processor, historical transaction fraud data based on the captured user device data, the historical transaction fraud data comprising a plurality of device data characteristics known to originate from a fraudulent source;
determining, by the processor, a secondary fraud risk based on the captured user device data by determining whether the captured user device data matches data from the historical transaction fraud data; and
transmitting, by the processor, a fraudulent verification notification to a payment system in response to determining that the secondary fraud risk is a high risk based upon the captured device data matching data from the historical transaction data.

9. The system of claim 8, further comprising transmitting, by the processor, a verification approval to the payment system in response to determining the secondary fraud risk is a low risk, wherein in response to receiving the verification approval the payment system is configured to remove a pending fraud status from the transaction account.

10. The system of claim 8, wherein the secondary fraud risk is determined based on if-then logic comparing the captured user device data to a fraud threshold.

11. The system of claim 8, wherein the secondary fraud risk is determined by inputting the captured user device data into at least one of a statistical model, a machine learning model, or an artificial intelligence model.

12. The system of claim 8, wherein the captured user device data comprises at least one of a unique device ID, an internet protocol (IP) address, an operating system type, a web browser type, an enabled language, a screen resolution setting, a scripting setting, or an anonymous IP indicator.

13. An article of manufacture including a non-transitory, tangible computer readable storage medium having instructions stored thereon that, in response to execution by a computer-based system, cause the computer-based system to perform operations comprising:
identifying, by the computer-based system, a primary fraud risk based on a transaction request corresponding to a transaction account;
identifying, by the computer-based system, a notification channel for a fraud protection notification;
transmitting, by the computer-based system, a notification to a user device in response to identifying the primary fraud risk, the notification sent through the notification channel and comprising a link to a risk assessment engine comprising a confirmation link that confirms the transaction is legitimate;
obtaining, by the computer-based system, a response to the notification from the user device, the response comprising the user device accessing the link to the risk assessment engine;
executing, by the computer-based system, a script associated with the link, the script configured to retrieve and capture user device data from the user device accessing the link to the risk assessment engine, wherein the user device data comprises at least one characteristic corresponding to software or physical parameters of the user device;
receiving, by the computer-based system, captured user device data from the script;
retrieving, by the computer-based system, historical transaction fraud data based on the captured user device data, the historical transaction fraud data comprising a plurality of device data characteristics known to originate from a fraudulent source;
determining, by the computer-based system, a secondary fraud risk based on the captured user device data by determining whether the captured user device data matches data from the historical transaction fraud data; and transmitting, by the computer-based system, a fraudulent verification notification to a payment system in response to determining that the secondary fraud risk is a high risk based upon the captured device data matching data from the historical transaction data.

14. The article of manufacture of claim 13, further comprising transmitting, by the computer-based system, a verification approval to the payment system in response to determining the secondary fraud risk is a low risk, wherein in response to receiving the verification approval the payment system is configured to remove a pending fraud status from the transaction account.

15. The article of manufacture of claim 13, wherein in response to receiving the fraudulent verification notification the payment system is configured to flag the transaction account for a fraud resolution.

16. The article of manufacture of claim 13, wherein the secondary fraud risk is determined based on if-then logic comparing the captured user device data to a fraud threshold.

17. The article of manufacture of claim 13, wherein the secondary fraud risk is determined by inputting the captured user device data into at least one of a statistical model, a machine learning model, or an artificial intelligence model.

18. The article of manufacture of claim 13, wherein the captured user device data comprises at least one of a unique device ID, an internet protocol (IP) address, an operating system type, a web browser type, an enabled language, a screen resolution setting, a scripting setting, or an anonymous IP indicator.

* * * * *